US 7,003,593 B2

(12) United States Patent
Huppenthal et al.

(10) Patent No.: US 7,003,593 B2
(45) Date of Patent: Feb. 21, 2006

(54) COMPUTER SYSTEM ARCHITECTURE AND MEMORY CONTROLLER FOR CLOSE-COUPLING WITHIN A HYBRID PROCESSING SYSTEM UTILIZING AN ADAPTIVE PROCESSOR INTERFACE PORT

(75) Inventors: Jon M. Huppenthal, Colorado Springs, CO (US); Thomas R. Seeman, Colorado Springs, CO (US); Lee A. Burton, Divide, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 55 days.

(21) Appl. No.: 10/282,986

(22) Filed: Oct. 29, 2002

(65) Prior Publication Data

US 2003/0061432 A1    Mar. 27, 2003

Related U.S. Application Data

(60) Continuation-in-part of application No. 09/755,744, filed on Jan. 5, 2001, now abandoned, which is a division of application No. 09/481,902, filed on Jan. 12, 2000, now Pat. No. 6,247,110, which is a continuation of application No. 08/992,763, filed on Dec. 17, 1997, now Pat. No. 6,076,152.

(51) Int. Cl.
*G06F 13/28* (2006.01)

(52) U.S. Cl. .............................. 710/25; 710/23; 710/24; 710/26; 710/27; 710/28; 700/2; 700/3; 700/4; 700/5; 700/6

(58) Field of Classification Search ................ 700/2–6; 710/22–28
See application file for complete search history.

(56) References Cited

U.S. PATENT DOCUMENTS

| 4,453,214 A | * | 6/1984 | Adcock ...................... 710/114 |
| 4,730,268 A | * | 3/1988 | Marin ........................ 710/119 |
| 4,974,148 A | * | 11/1990 | Matteson .................... 713/600 |
| 5,136,500 A | | 8/1992 | Lemay et al. |
| 5,193,149 A | * | 3/1993 | Awiszio et al. ............. 709/250 |

(Continued)

FOREIGN PATENT DOCUMENTS

EP          000318702 A2 * 10/1988

(Continued)

OTHER PUBLICATIONS

Agarwal, A., et al., "The Raw Compiler Project", pp. 1-12, http://cag-www.lcs.mit.edu/raw, Proceedings of the Second SUIF Compiler Workshop, Aug. 21-23, 1997.

(Continued)

*Primary Examiner*—Kim Huynh
*Assistant Examiner*—Alan S. Chen
(74) *Attorney, Agent, or Firm*—William J. Kubida; Michael C. Martensen; Hogan & Hartson LLP

(57) ABSTRACT

A computer system architecture and memory controller for close-coupling within a hybrid computing system using an adaptive processor interface port ("APIP") added to, or in conjunction with, the memory and I/O controller chip of the core logic. Memory accesses to and from this port, as well as the main microprocessor bus, are then arbitrated by the memory control circuitry forming a portion of the controller chip. In this fashion, both the microprocessors and the adaptive processors of the hybrid computing system exhibit equal memory bandwidth and latency. In addition, because it is a separate electrical port from the microprocessor bus, the APIP is not required to comply with, and participate in, all FSB protocol. This results in reduced protocol overhead which results higher yielded payload on the interface.

38 Claims, 7 Drawing Sheets

U.S. PATENT DOCUMENTS

| | | | |
|---|---|---|---|
| 5,194,895 | A | 3/1993 | Bares |
| 5,230,057 | A | 7/1993 | Shido et al. |
| 5,384,906 | A | 1/1995 | Horst |
| 5,414,857 | A | 5/1995 | Jeddeloh et al. |
| 5,570,040 | A | 10/1996 | Lytle et al. |
| 5,696,910 | A | 12/1997 | Pawlowski |
| 5,737,766 | A | 4/1998 | Tan |
| 5,887,165 | A * | 3/1999 | Martel et al. ............... 713/100 |
| 5,892,962 | A | 4/1999 | Cloutier |
| 5,903,771 | A | 5/1999 | Sgro et al. |
| 5,949,762 | A * | 9/1999 | Green et al. ................ 370/259 |
| 6,023,748 | A | 2/2000 | Peters et al. |
| 6,023,755 | A | 2/2000 | Casselman |
| 6,052,773 | A | 4/2000 | DeHon et al. |
| 6,076,152 | A | 6/2000 | Huppenthal et al. |
| 6,078,736 | A * | 6/2000 | Guccione ..................... 716/16 |
| 6,118,462 | A * | 9/2000 | Margulis .................... 345/535 |
| 6,128,731 | A | 10/2000 | Zarrin et al. |
| 6,192,439 | B1 | 2/2001 | Grunewald et al. |
| 6,226,776 | B1 | 5/2001 | Panchul et al. |
| 6,247,110 | B1 | 6/2001 | Huppenthal et al. |
| 6,339,819 | B1 | 1/2002 | Huppenthal et al. |
| 6,356,109 | B1 | 3/2002 | Furuta et al. |
| 6,414,391 | B1 | 7/2002 | Corisis et al. |
| 6,434,636 | B1 | 8/2002 | Van Gaasbeck |
| 6,441,483 | B1 | 8/2002 | Akram |
| 6,442,597 | B1 | 8/2002 | Deshpande et al. |
| 6,446,145 | B1 | 9/2002 | Har et al. |
| 6,496,971 | B1 | 12/2002 | Lesea et al. |
| 6,654,818 | B1 | 11/2003 | Thurber |
| 2002/0038393 | A1 | 3/2002 | Ganapathy et al. |
| 2002/0078273 | A1 | 6/2002 | Jacobs |

FOREIGN PATENT DOCUMENTS

| | | | |
|---|---|---|---|
| JP | 58-200323 | A * | 11/1983 |
| JP | 62-006366 | A * | 1/1987 |
| JP | 04-251352 | A * | 9/1992 |
| JP | 5-181793 | A * | 7/1993 |

OTHER PUBLICATIONS

Albaharna, Osama, et al., "On the viability of FPGA-based integrated coprocessors", © 1996 IEEE, Publ. No. 0-8186-7548-9/96, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", © 1993 Massachusetts Institute of Technology, pp. 88-102.

Bittner, Ray, et al., "Computing kernels implem nted with a wormhole RTR CCM", © 1997 IEEE, Publ. No. 0-8186-8159-4/97, pp. 98-105.

Buell, D., et al., "Splash 2: FPGAs in a Custom Computing Machine—Chapter 1—Custom Computing Machines: An Introduction", pp. 1-11, http://www.computer.org/espress/catalog/bp07413/spls-ch1.html (originally believed published in J. of Supercomputing, vol. IX, 1995, pp. 219-230.

Casselman, Steven, "Virtual Computing and The Virtual Computer", © 1993 IEEE, Publ. No. 0-8186-3890-7/93, pp. 43-48.

Chan, Pak, et al., "Architectural tradeoffs in field-programmable-device-based computing systems", © 1993 IEEE, Publ. No. 0-8186-3890-7/93, pp. 152-161.

Clark, David, et al., "Supporting FPGA microprocessors through retargetable software tools", © 1996, IEEE, Publ. No. 8186-7548-9/96, pp. 195-103.

Cuccaro, Steven, et al., "The CM-2X: a hybrid CM-2/Xilink prototype", © 1993 IEEE, Publ. No. 0-8186-3890-7/93, pp. 121-130.

Culbertson, W. Bruce, et al., "Exploring architectures for volume visualization on the Teramac custom computer", © 1996 IEEE, Publ. No. 0-8186-7548-9/96, pp. 80-88.

Culbertson, W. Bruce, et al., "Defect tolerance on the Teramac custom computer", © 1997 IEEE, Publ. No. 0-8186-8159-4/97, pp. 116-123.

Dehon, Andre, "DPGA-Coupled microprocessors: commodity IC for the early $21^{st}$ century", © 1994 IEEE, Publ. No. 0-8186-5490-2/94, pp. 31-39.

Dehon, A., et al., "MATRIX A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. No. 0-8186-5490-2/94, pp. 72-81.

Elliott, Duncan, et al., "Computational Ram: a memory-SIMD hybrid and its application to DSP", © 1992 IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernhard, et al., "Assessing Document Relevance with Run-Time Reconfigurable Machines", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al., "A General Approach in System Design Integrating Reconfigurable Accelerators," http://xputers.informatik.uni-kl.de/papers/paper026-1.html, IEEE 1996 Conference, Austin, TX, Oct. 9-11, 1996.

Hartenstein, Reiner, et al., "A reconfigurable data-driven ALU for Xputers", © 1994 IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1986 IEEE, Publ. No. 0272-1732/86/1000-0006, pp. 6-17.

Herpel, H. -J., et al., "A Reconfigurable Computer for Embedded Control Applications", © 1993 IEEE, Publ. No. 0-8186-3890-7/93, pp. 111-120.

Hogl, H., et al., "Enable++: A second generation FPGA processor", © 1995 IEEE, Publ. No. 0-8186-7086-X/95, pp. 45-53.

King, William, et al., "Using MORRPH in an industrial machine vision system", © 1996 IEEE, Publ. No. 08186-7548-9/96, pp. 18-26.

Manohar, Swaminathan, et al., "A pragmatic approach to systolic design", © 1988 IEEE, Publ. No. CH2603-9/88/0000/0463, pp. 463-472.

Maudit, Nicolas, et al., "Lneuro 1.0: a piece of hardware LEGO for building neural network systems," © 1992 IEEE, Publ. No. 1045-9227/92, pp. 414-422.

Mirsky, Ethan A., "Coarse-Grain Reconfigurable Computing", Massachusetts Institute of Technology, Jun. 1996.
Mirsky, Ethan, et al., "MATRIX: A Reconfigurable Computing Architecture with Configurable Instruction Distribution and Deployable Resources", © 1996, IEEE, Publ. No. 0-8186-7548-9/96, pp. 157-166.
Morley, Robert E., Jr., et al., "A Massively Parallel Systolic Array Processor System", © 1988 IEEE, Publ. No. CH2603-9/88/0000/0217, pp. 217-225.
Patterson, David, et al., "A case for intelligent DRAM: IRAM", Hot Chips VIII, Aug. 19-20, 1996, pp. 75-94.
Peterson, Janes, et al., "Scheduling and partitioning ANSI-C programs onto multi-FPGA CCM architectures", © 1996 IEEE, Publ. No. 0-8186-7548-9/96, pp. 178-187.
Schmit, Herman, "Incremental reconfiguration for pipelined applications," © 1997 IEEE, Publ. No. 0-8186-8159-4/97, pp. 47-55.
Sitkoff, Nathan, et al., "Implementing a Genetic Algorithm on a Parallel Custom Computing Machine", Publ. No. 0-8186-7086-X/95, pp. 180-187.
Stone, Harold, "A logic-in-memory computer", © 1970 IEEE, IEEE Transactions on Computers, pp. 73-78, Jan. 1990.
Tangen, Uwe, et al., "A parallel hardware evolvable computer POLYP extended abstract", © 1997 IEEE, Publ. No. 0-8186-8159/4/97, pp. 238-239.
Thornburg, Mike, et al., "Transformable Computers", © 1994 IEEE, Publ. No. 0-8186-5602-6/94, pp. 674-679.
Tomita, Shinji, et al., "A computer low-level parallelism QA-2", © 1986 IEEE, Publ. No. 0-0384-7495/86/0000/0280, pp. 280-289.
Trimberger, Steve, et al., "A time-mutilplexed FPGA", © 1997 IEEE, Publ. No. 0-8186-8159-4/97, pp. 22-28.
Ueda, Hirotada, et al., "A multiprocessor system utilizing enhanced DSP's for image processing", © 1988 IEEE, Publ. No. CH2603-9/88/0000/0611, pp. 611-620.
Villasenor, John, et al., "Configurable computing", © 1997 Scientific American, Jun. 1997.
Wang, Quiang, et al., "Automated field-programmable compute accelerator design using partial evaluation", © 1997 IEEE, Publ. No. 0-8186-8159-4/97, pp. 145-154.
W.H. Mangione-Smith and B.L. Hutchings. Configurable computing: The Road Ahead. In Proceedings of the Reconfigurable Architectures Workshop (RAW'97), pp. 81-96, 1997.
Wirthlin, Michael, et al., "The Nano processor: a low resource reconfigurable processor", © 1994 IEEE, Publ. No. 0-8186-5490-2/94, pp. 23-30.
Wirthlin, Michael, et al., "A dynamic instruction set computer", © 1995 IEEE, Publ. No. 0-8186-7086-X/95, pp. 99-107.
Wittig, Ralph, et al., "One Chip: An FPGA processor with reconfigurable logic", © 1996 IEEE, Publ. No. 0-8186-7548-9/96, pp. 126-135.
Yamauchi, Tsukasa, et al., "SOP: A reconfigurable massively parallel system and its control-data flow based compiling method", © 1996 IEEE, Publ. No. 0-8186-7548-9/96, pp. 148-156.
"Information Brief", PCI bus Technology, © IBM Personal Computer Company, 1997, pp. 1-3.
Yun, Hyun-Kyu and Silverman, H. F.; "A distributed memory MIMD multi-computer with reconfigurable custom computing capabilities", Brown University, Dec. 10-13, 1997, pp. 7-13.
Hoover, Chris and Hart, David; "San Diego Superconductor Center, Timel gic and Sun Validate Ultra-Fast Hidden Markov Model Analysis-One DeCypher-acc lerated Sun Fire 6800 beats 2,600 CPUs running Linux-", San Diego Supercomputer C nter, http://www.sdsc.edu/Press/02/050802_markovmodel.html, May 8, 2002, pp. 1-3.
Caliga, David and Barker, David Peter, "Delivering Acceleration: The Potential for Increased HPC Application Performance Using Reconfigurable Logic", SRC Computers, Inc., Nov. 2001, pp. 20.
Hammes, J.P., Rinker, R. E., McClure, D. M., Böhm, A. P. W., Najjar, W. A., "The SA-C Compiler Dataflow Description", Colorado State University, Jun. 21, 2001, pp. 1-25.
Callahan, Timothy J. and Wawrzynek, John, "Adapting Softwar Pipelining for Reconfigurable Computing", University of California at Berkel y, N vember 17-19, 2000, pp. 8.
Ratha, Nalini K., Jain, Anil K. and Rover, Diane T., "An FPGA-based Point Pattern Matching Processor with Application to Fingerprint Matching", Michigan State University, Department of Computer Science, pp. 8.
Dehon, Andr, "Comparing Computing Machines", University of California at Berkeley, Proceedings of SPIE vol. 3526, Nov. 2-3, 1998, pp. 11.
Vemuri, Ranga R. and Harr, Randolph E., "Configurable Computing: Technology and Applications", University of Cincinnati and Synopsys Inc., IEEE, Apr. 2000, pp. 39-40.
Dehon, André, "The Density Advantage of Configurable Computing", California Institute of Technology, IEEE, Apr. 2000. pp. 41-49.
Haynes, Simon D., Stone, John, Cheung, Peter Y.K. and Luk, Wayne, "Video Image Processing with the Sonic Architecture", Sony Broadcast & Professional Europe, Imperial College, University of London, IEEE, Apr. 2000, pp. 50-57.
Platzner , Marco, "Reconfigurable Accelerators for Combinatorial Problems", Swiss Federal Institute of Technology (ETH) Zurich, IEEE, Apr. 2000, pp. 58-60.
Callahan, Timothy J., Hauser, John R. and Wawrzynek, John, "The Garp Architecture and C Compiler", University of California, Berkeley, IEEE, Apr. 2000. pp. 62-69.
Goldstein, Seth Copen, Schmit, Herman, Budiu , Mihai, Cadambi, Srihari, Moe, Matt and Taylor, R. Reed, "PipeRench: A Reconfigurable Architecture and Compiler", Carnegie Mellon University, IEEE, Apr. 2000, pp. 70-76.
Muchnick, Steven S., "Advanced Compiler Design and Implementation", Morgan Kaufmann Publishers, pp. 217.
Hammes, Jeffrey P., Dissertation "Compiling SA-C To Reconfigurable Computing Systems", Colorado State University, Department of Computer Science, Summer 2000, pp. 179.
Automatic Target Recognition, Colorado State University & USAF, http://www.cs.colostate.edu/cameron/applications.html, pp. 1-3.
Chodowiec, Pawel, Khuon, Po, Gaj, Kris, Fast Implementations of Secret-Key Block Ciphers Using Mixed Inner- and Outer-Round Pipelining, George Mason University, Feb. 11-13, 2001, pp. 9.

* cited by examiner

COMPUTER SYSTEM ARCHITECTURE AND MEMORY CONTROLLER FOR CLOSE-COUPLING WITHIN A HYBRID PROCESSING SYSTEM UTILIZING AN ADAPTIVE PROCESSOR INTERFACE PORT

CROSS REFERENCE TO RELATED PATENT APPLICATIONS

The present invention claims priority from, and is a continuation-in-part application of, U.S. patent application Ser. No. 09/755,744 filed Jan. 5, 2001 now abandoned for: "Multiprocessor Computer Architecture Incorporating a Plurality of Memory Algorithm Processors in the Memory Subsystem" which is a divisional application of U.S. patent application Ser. No. 09/481,902 filed Jan. 12, 2000 (now U.S. Pat. No. 6,247,110) which is a continuation application of U.S. patent application Ser. No. 08/992,763 filed Dec. 17, 1997 (now U.S. Pat. No. 6,076,152). The present invention is related to the subject matter of U.S. Pat. No. 6,339,819 issued Jan. 15, 1992 for: "Multiprocessor with Each Processor Element Accessing Operands in Loaded Input Buffer and Forwarding Results to FIFO Output Buffer". The foregoing patent application and issued patents are assigned to SRC Computers, Inc., assignee of the present invention, the disclosures of which are herein specifically incorporated in their entirety by this reference.

BACKGROUND OF THE INVENTION

The present invention relates, in general, to the field of computer systems and techniques for interconnecting various processing or computing elements. More particularly, the present invention relates to a hybrid computer system architecture and memory controller for close-coupling within a hybrid computing system using an adaptive processor interface port.

Hybrid computer systems are those that incorporate both standard microprocessors and adaptive processors. These are typically large multiprocessor server-type systems that reside on a shared network and are not directly operated with a user interface console. The overall performance and flexibility of such systems is directly proportional to the level of coupling between the microprocessors and the adaptive processors. That is to say, if the two processor types are treated as peers and have equal bandwidths and latencies to a shared memory, the system performance will be maximized.

To date, there have been several accepted methodologies for coupling the two forms of processors. The most basic of which was to connect the adaptive processor via the standard input/output ("I/O") ports to the microprocessor. This is relatively simple in practice but provides only a very loose coupling with low bandwidths and high latencies relative to the bandwidths and latencies of the processor bus. Since both types of processors must share the same memory, this leads to significantly reduced performance in the adaptive processors. This technique also limits the amount of processor interaction that can realistically occur.

The second typical method of interconnection is to place the adaptive processor in the memory space of the microprocessor such as disclosed in certain specific embodiments disclosed in the aforementioned patents and patent applications. This connection yields a much tighter coupling as well as bandwidths and latencies typically equal to the microprocessor bus. However, particularly for small transfers, there may be more overhead associated with this connection than is desired. This is due to the "slaved" nature of the standard memory subsystem in a personal computer environment.

The third known method is to place the adaptive processor directly on the microprocessor bus or primary microprocessor interconnect (e.g. the Front Side Bus "FSB"). This method would seem to insure that the adaptive processor will have the same bandwidth and latency to the rest of the system as the microprocessors. However, in reality, this may not be true. In the case of Intel® microprocessors, a foreign device such as the adaptive processor, may be subject to special treatment and is classified as a third party agent. As such, it may not be able to use many features of the bus such as those associated with movement of cached data or data movement to I/O devices. It may also be the case that the adaptive processor is itself a whole circuit board and connection of it to the microprocessor may violate the bus layout ground rules. In addition, the adaptive processor would also have to participate in all of the microprocessor bus protocol, such as correctly responding to cache coherency related transactions, even though it may not be a coherent bus agent.

SUMMARY OF THE INVENTION

There is however a way to accomplish the desired coupling while eliminating issues associated with residing on the microprocessor bus. This is through the use of a dedicated adaptive processor interface port ("APIP") added to, or in conjunction with, the memory and I/O controller chip of the core logic, typically called the "North Bridge", on Intel® based processor boards today. Memory accesses to and from this port as well as the main microprocessor bus, are then arbitrated by the circuitry inside the memory controller. In this fashion, both the microprocessors and the adaptive processors exhibit equal memory bandwidth and latency. In addition, because it is a separate electrical port from the microprocessor bus, the APIP is not required to comply with, and participate in, all FSB protocol. This results in reduced protocol overhead which results higher yielded payload on the interface.

To accelerate data movement to the adaptive processor, it is also possible to include a Direct Memory Access ("DMA") engine inside the North Bridge. This would allow the adaptive processor to issue a single "read" request over the APIP that would result in the DMA engine actually retrieving and transmitting a large data block to the adaptive processor. This DMA engine can handle both a "read" and "write" request simultaneously to allow streaming operations to occur as efficiently as possible within the adaptive processor.

To allow very large systems to be constructed, this port can be provided with enough drive capability to allow it to be connected to an external interconnect such as a large crossbar switch. In this fashion, many of the adaptive processors and microprocessors can work in a randomly interconnected way to solve problems. Due to the potential for any given port of the switch to be busy at any point in time, it may be desirable for the outbound path of the APIP to be equipped with a small buffer to allow the completion of "read" memory accesses that may be underway when the path goes busy without the loss of data. As soon as the path is free, the buffer can be drained and transmitted and the current DMA resumed. One way to indicate a busy path could be communicated through the use of a "busy" signal sent from the busy receiver port to the transmitter to which it is connected. Consequently, the APIP will stop transmission when it receives a "busy" signal and will generate a separate "busy" signal when it can no longer receive data for whatever reason.

To aid in control of the adaptive processor as well as in direct communication between the adaptive processor and the microprocessor, a series of preferably 64 bit registers should be included in the memory controller. These registers could then be made accessible from either the microprocessor or the adaptive processor.

Typically there is a need for processors to interrupt each other in a large system. The same is true when dealing with a hybrid system. Therefore, the APIP can be provided with the ability to accept inter-processor interrupts from the microprocessor and send them to other processors in the system as well as performing the reverse function and receive inter-processor interrupts. This port could be similar in physical appearance to an AGP graphics port. In fact, since the accelerated graphics port ("AGP") is typically not used on servers due to the absence of monitors, it would actually be possible to use the same device pins on the memory controller and use a register to allow the port to be configured as either AGP or APIP.

Particularly disclosed herein is a computer system which comprises at least one microprocessor presenting a first bus, a memory controller coupled to the first bus and also coupled to a memory bus and an adaptive processor port, a memory block coupled to the memory bus and an adaptive processor coupled to the adaptive processor port.

Further disclosed herein is a hybrid computing system comprising at least one microprocessor, a memory block, a memory controller coupled to the microprocessor and the memory block for controlling accesses to the memory block by the at least one microprocessor and at least one adaptive processor coupled to the memory controller with the memory controller further controlling accesses to the memory block by the at least one adaptive processor.

Still further disclosed herein is a computing system comprising first and second processing elements, a memory block and a memory controller coupled to the first processing element through a first bus and the second processing element through a second bus with the memory controller controlling accesses to the memory block by the first and second processing elements.

Also disclosed herein is a memory controller for a computing system comprising a memory bus arbitrator coupled between first and second processing elements and a memory block with the memory bus arbitrator controlling access to the memory block by the first and second processing elements.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
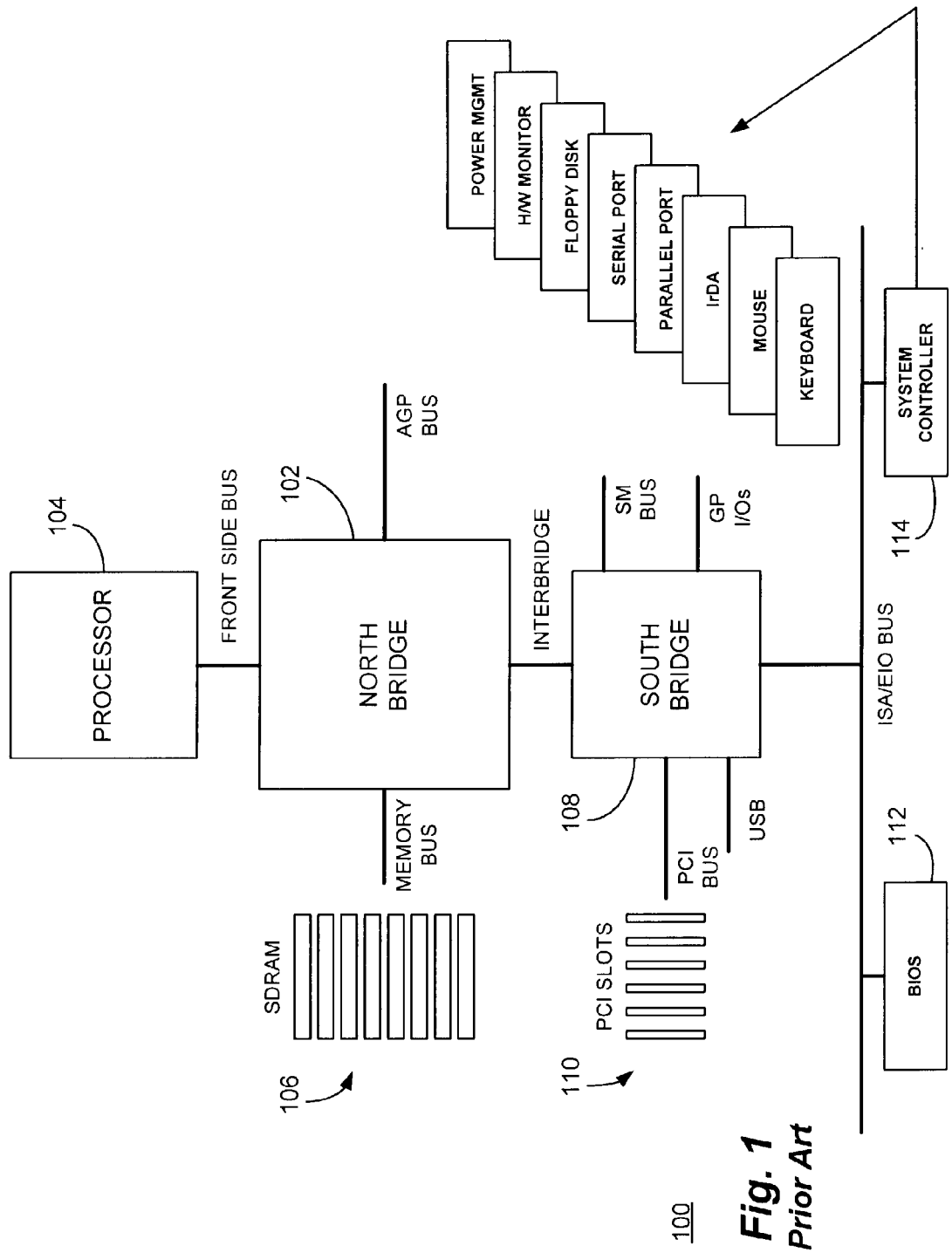
FIG. 1 is a high-level functional block diagram of a typical computing system, for example, a personal computer ("PC") implemented in conjunction with a memory and input/output ("I/O") controller ("North Bridge") and a peripheral component interconnect ("PCI") bus I/O controller ("South Bridge")

With reference now to FIG. 1, a high-level functional block diagram of a typical computing system 100 is shown. The computing system 100 may be, for example, a personal computer ("PC") which incorporates a commercially available integrated circuit ("IC") memory controller ("North Bridge") 102 such as the P4X333/P4X400 devices available from VIA Technologies, Inc.; the M1647 device available from Acer Labs, Inc. and the 824430X device available from Intel Corporation. The North Bridge IC 102 is coupled by means of a Front Side Bus ("FSB") to a processor 104 such as one of the Pentium® series of processors also available from Intel Corporation.

The North Bridge IC 102 is coupled via a separate memory bus to system memory 106 which may comprise, for example, a number of synchronous dynamic random access ("SDRAM") memory modules. A dedicated accelerated graphics port ("AGP") is provided for interfacing the system 100 to a graphics accelerator while an inter-bridge bus couples the North Bridge IC 102 to an additional input/output I/O controller IC ("South Bridge") 108. The South Bridge IC may be, for example, an SLC90E66 device available form Standard Microsystems, Corporation or the VT8235 device available from VIA Technologies.

The South Bridge IC 108 couples the system 100 to a peripheral component interconnect ("PCI") bus for interfacing to a number of dedicated PCI slots 110. Interconnections with a universal serial bus ("USB"), system management ("SM") bus and general purpose ("GP") I/O bus are also provided as well as to an industry standard architecture/extended I/O ("ISA/EIO") bus to a basic input/output system ("BIOS") block 112 and a system controller 114 which controls a number of the various components of the system 100.

Figure 2:
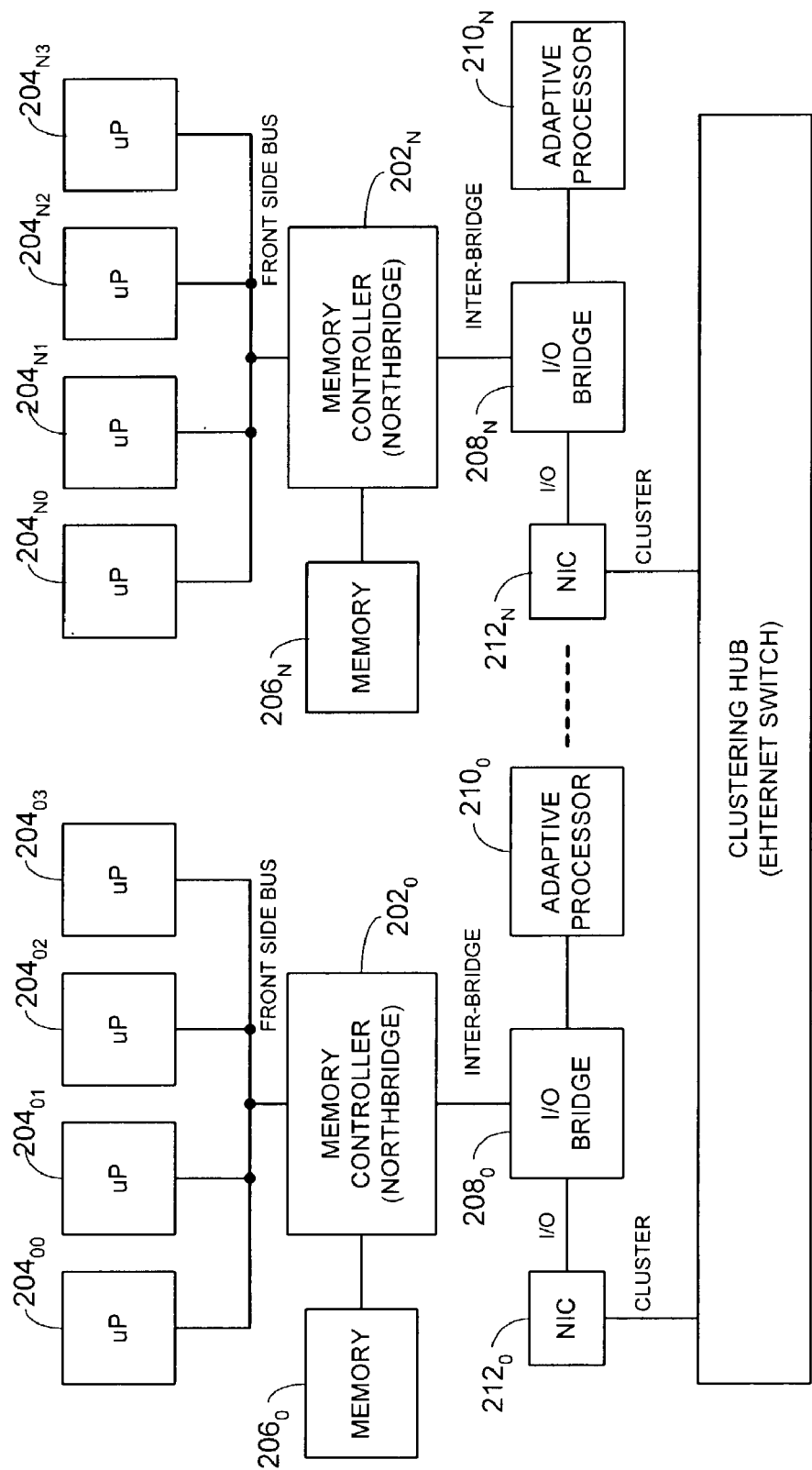
FIG. 2 is a functional block diagram of a typical I/O connected hybrid computing system comprising a number of microprocessors and adaptive processors, with the latter being coupled to an I/O bridge.

With reference additionally now to FIG. 2, a functional block diagram of a typical I/O connected hybrid computing system 200 is shown. The hybrid computing system 200 comprises one or more North Bridge ICs $202_0$ through $202_N$, each of which is coupled to four microprocessors $204_{00}$ through $204_{03}$ through and including $204_{N0}$ through $204_{N3}$ by means of a Front Side Bus. The North Bridge ICs $202_0$ through $202_N$ are coupled to respective blocks of memory $206_0$ through $206_N$ as well as to a corresponding I/O bridge element $208_0$ through $208_N$. A network interface card ("NIC") $212_0$ through $212_N$ couples the I/O bus of the respective I/O bridge $208_0$ through $208_N$ to a cluster bus coupled to a common clustering hub (or Ethernet Switch) 214.

As shown, an adaptive processor element $210_0$ through $210_N$ is coupled to, and associated with, each of the I/O bridges $208_0$ through $208_N$. This is the most basic of the existing approaches for connecting an adaptive processor 210 in a hybrid computing system 200 and is implemented, essentially via the standard I/O ports to the microprocessor(s) 204. While relatively simple to implement, it results in a very "loose" coupling between the adaptive processor 210 and the microprocessor(s) 204 with resultant low bandwidths and high latencies relative to the bandwidths and latencies of the processor bus. Moreover, since both types of processors 204, 210 must share the same memory 206, this leads to significantly reduced performance in the adaptive processors 210. Functionally, this architecture effectively limits the amount of interaction between the microprocessor(s) 204 and the adaptive processor 210 that can realistically occur.

Figure 3:
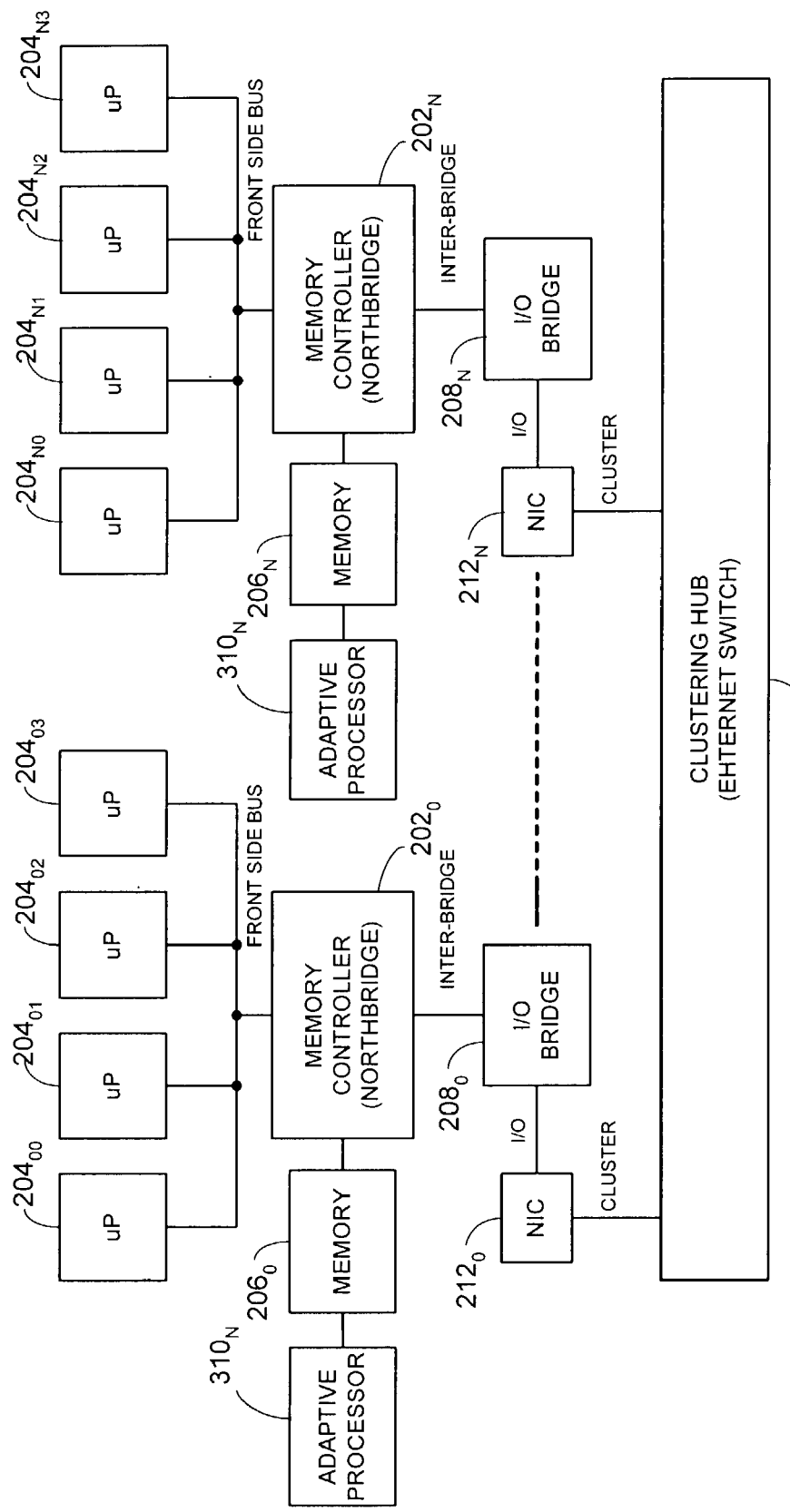
FIG. 3 is a functional block diagram of a typical memory connected hybrid computing system comprising a number of microprocessors and adaptive processors, with the latter being coupled to the system memory.

With reference additionally now to FIG. 3, a functional block diagram of a typical memory connected hybrid computing system 300 is shown. The hybrid computing system 300 also comprises a number of North Bridge ICs $202_0$ through $202_N$, each of which is coupled to four microprocessors $204_{00}$ through $204_{03}$ through and including $204_{N0}$ through $204_{N3}$ by means of a Front Side Bus. The North Bridge ICs $202_0$ through $202_N$ are coupled to respective blocks of memory $206_0$ through $206_N$ as well as to a corresponding I/O bridge element $208_0$ through $208_N$. A network interface card ("NIC") $212_0$ through $212_N$ couples the I/O bus of the respective I/O bridge $208_0$ through $208_N$ to a cluster bus coupled to a common clustering hub (or Ethernet Switch) 214.

As shown, an adaptive processor element $310_0$ through $310_N$ is coupled to, and associated with, each of the blocks of memory $206_0$ through $206_N$. In this particular computing system 300 architecture, the adaptive processor 310 is effectively placed in the memory 206 space of the microprocessor(s) 204 in a manner as disclosed in certain of the afore-mentioned patents. The architecture of the computing system 200 shown yields a much tighter coupling between the microprocessor(s) 204 and the adaptive processor 310 than that of the computing system 200 of the preceding figure as well as providing bandwidths and latencies typically equal to the microprocessor bus itself. Nevertheless, particularly for small transfers, there may be more overhead associated with this type of interconnection than is desired due to the effectively "slaved" nature of the standard memory subsystem in a personal computing environment.

Figure 4:
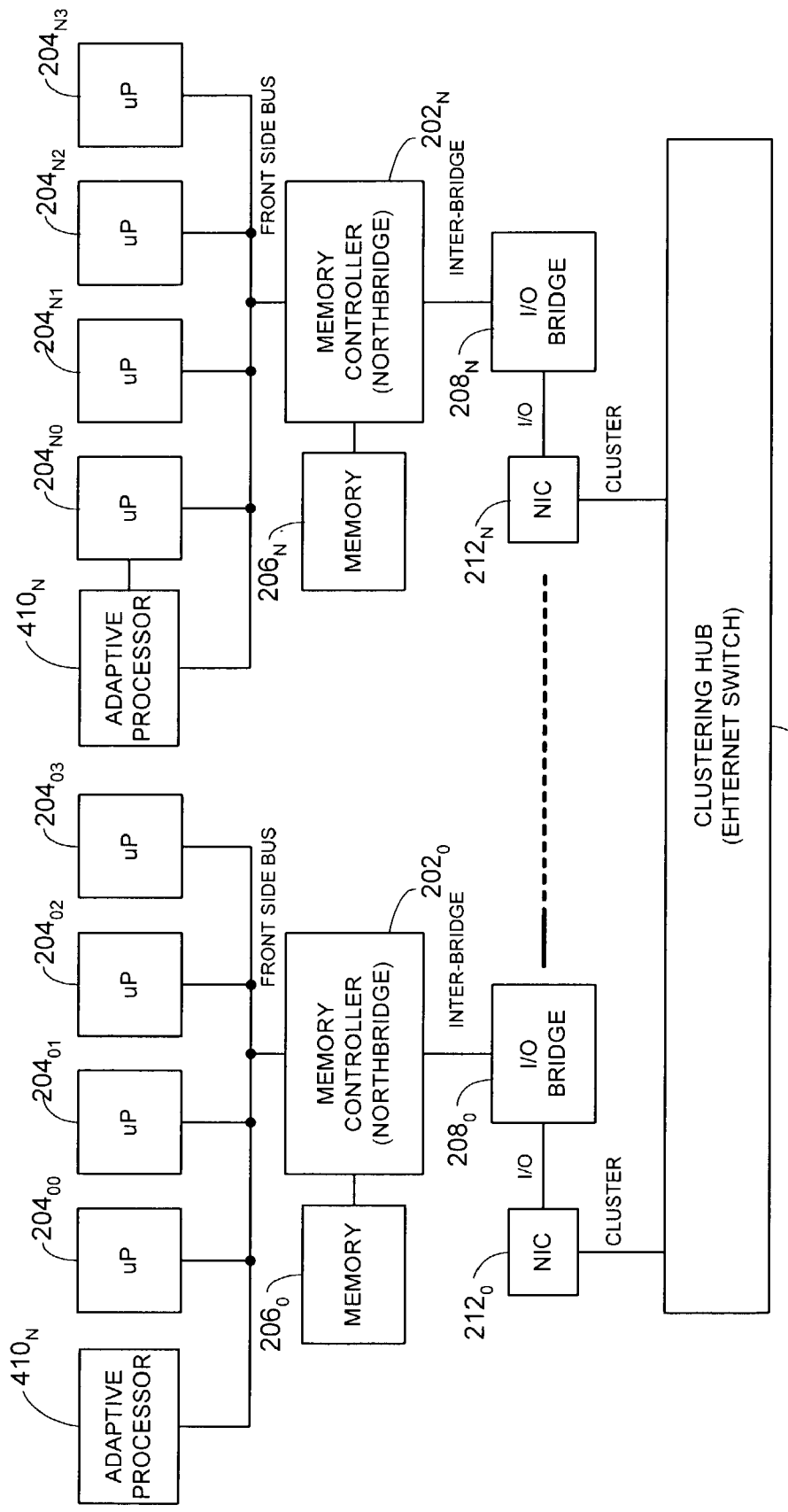
FIG. 4 is a functional block diagram of a typical Front Side Bus ("FSB") connected hybrid computing system comprising a number of microprocessors and adaptive processors, with the latter being coupled directly to the FSB.

With reference additionally now to FIG. 4, a functional block diagram of a typical Front Side Bus ("FSB") connected hybrid computing system 400 is shown. The hybrid computing system 400 again comprises a number of North Bridge ICs $202_0$ through $202_N$, each of which is coupled to four microprocessors $204_{00}$ through $204_{03}$ through and including $204_{N0}$ through $204_{N3}$ by means of a Front Side Bus. The North Bridge ICs $202_0$ through $202_N$ are coupled to respective blocks of memory $206_0$ through $206_N$ as well as to a corresponding I/O bridge element $208_0$ through $208_N$. A network interface card ("NIC") $212_0$ through $212_N$ couples the I/O bus of the respective I/O bridge $208_0$ through $208_N$ to a cluster bus coupled to a common clustering hub (or Ethernet Switch) 214.

As shown, an adaptive processor element $210_0$ through $210_N$ is coupled to, and associated with, each of the Front Side Buses coupled to the microprocessors $204_{00}$ through $204_{03}$ through and including $204_{N0}$ through $204_{N3}$. In this particular architecture, the adaptive processor 410 is placed directly on the microprocessor 204 bus or Front Side Bus. This interconnection scheme would seem to insure that the adaptive processor 410 will have the same bandwidth and latency to the rest of the computing system 400 as the microprocessor(s) 204. However, in reality this may not be true. In the case of Intel® microprocessors, a "foreign" device such as the adaptive processor 410, may be subject to special treatment and is classified as a "third party agent". As such, it may not be able to use many features of the Front Side Bus such as those associated with the movement of cached data or data movement to I/O devices. It may also be the case that the adaptive processor 410 is itself an entire circuit board and connection of it to the microprocessor may violate the bus layout ground rules. In addition, the adaptive processor 410 would also have to participate in all of the microprocessor 204 bus protocol, such as correctly responding to cache coherency related transactions, even though it may not itself be a coherent bus agent.

Figure 5:
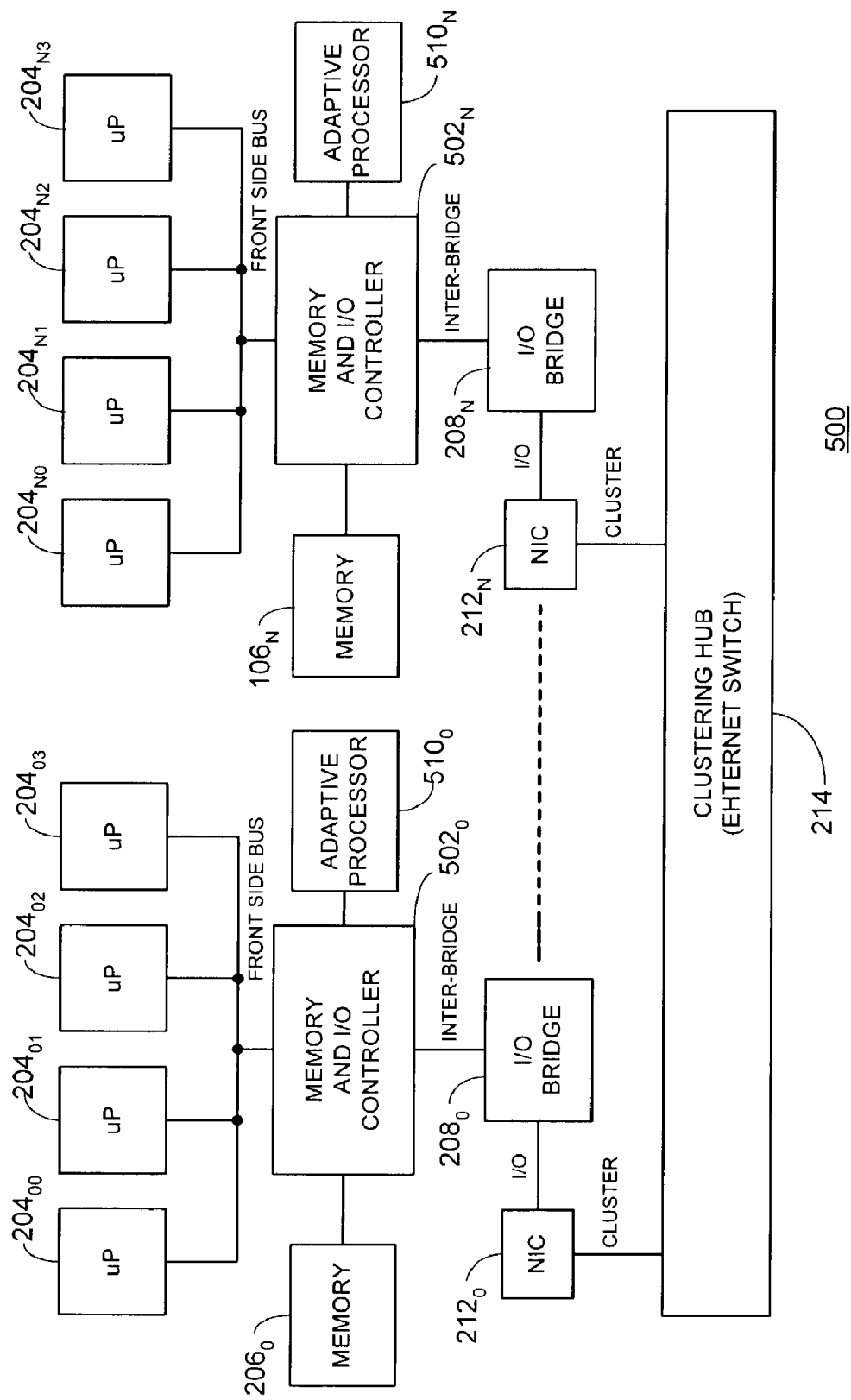
FIG. 5 is a corresponding functional block diagram of an adaptive processor interface port ("APIP") connected hybrid computing system in accordance with the present invention comprising a number of microprocessors and adaptive processors, with the latter being coupled directly to a memory and I/O controller.

With reference additionally now to FIG. 5, a corresponding functional block diagram of an adaptive processor interface port ("APIP") connected hybrid computing system 500 in accordance with the present invention. The computing system 500 comprises a number of memory and I/O controllers $502_0$ through $502_N$, each of which is coupled to four microprocessors $204_{00}$ through $204_{03}$ through and including $204_{N0}$ through $204_{N3}$ by means of a Front Side Bus. The memory and I/O controllers $502_0$ through $502_N$ are coupled to respective blocks of memory $206_0$ through $206_N$ as well as to a corresponding I/O bridge element $208_0$ through $208_N$. A network interface card ("NIC") $212_0$ through $212_N$ couples the I/O bus of the respective I/O bridge $208_0$ through $208_N$ to a cluster bus coupled to a common clustering hub (or Ethernet Switch) 214.

As shown, an adaptive processor element $510_0$ through $510_N$ is coupled to, and associated with, each of the memory and I/O controllers $502_0$ through $502_N$ through an adaptive processor interface port ("APIP") thereby improving the computing system 500 performance and eliminating the disadvantages of the foregoing conventional techniques. In other implementations of the present invention, one or more of the adaptive processor(s) 510 may be replaced with a conventional microprocessor coupled to the APIP interface.

In a preferred embodiment as disclosed herein, this may be effectuated through the use of a dedicated adaptive processor interface port added to, or associated with, the memory and I/O controller 502 (such as a North Bridge chip). Memory accesses to and from this APIP port, as well as those to and from the main microprocessor 204 bus (e.g. the Front Side Bus), are then arbitrated by the memory control circuitry inside the memory and I/O controller 502. In this fashion, both the microprocessor(s) 204 and the adaptive processor(s) 510 would have equal memory bandwidth and latency. In addition, because it is a separate electrical port from that of the microprocessor bus, the APIP is not required to comply with, and participate in, all FSB protocols. This results in reduced protocol overhead which, in turn, results in a higher yielded payload on the interface.

Figure 6:
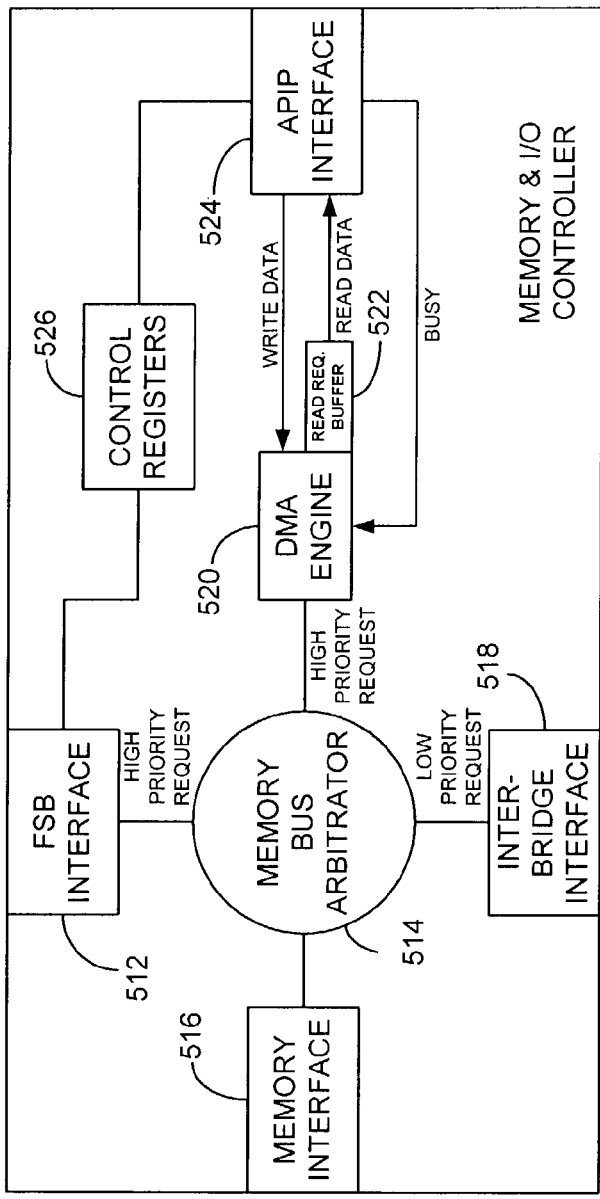
FIG. 6 is a functional block diagram of a memory and I/O controller implementing an APIP interface for use with an adaptive processor.

With reference additionally now to FIG. 6, a functional block diagram of the memory and I/O controller 502 implementing an APIP interface of the preceding figure is shown. The memory and I/O controller 502 includes an FSB interface 512 controlled by a memory bus arbitrator 514 for responding to high priority requests to/from the microprocessors $204_{00}$ through $204_{03}$ through and including $204_{N0}$ through $204_{N3}$. The memory bus arbitrator 514 also controls a memory interface 516 for providing access to the blocks of memory $206_0$ through $206_N$. Low priority requests through the I/O bridge elements $208_0$ through $208_N$ are made through an inter-bridge interface 518 as controlled by the memory bus arbitrator 514.

In lieu of, or in addition to, the conventional AGP bus interface, the memory and I/O controller 502 includes an APIP interface 524 as shown for interfacing and communication with an adaptive processor element $510_0$ through $510_N$. A direct memory access ("DMA") engine 520, in conjunction with a read request buffer 522 for "reads" handles high priority requests to and from the memory bus arbitrator 514 and the APIP interface 524 over, for example, separate "write data" and "read data" buses. The APIP interface 524 may, in an exemplary embodiment, include the provision of a "busy" signal from the APIP interface to the DMA engine 520. Further, a number of control registers 526 may also be provided coupling the FSB interface 512 to the APIP interface 524.

In operation, the DMA engine 520 can serve to accelerate data movement to the adaptive processor 510 through the memory and I/O controller 502. This functionality allows the adaptive processor(s) 510 to issue a single "read" request over the APIP interface 524 that would result in the DMA engine 520 actually retrieving and transmitting a large data block to the adaptive processor 510. The DMA engine 520 can handle both a "read" and "write" request simultaneously in order to allow streaming operations to occur as efficiently as possible within the adaptive processor 510.

To allow very large computing systems 500 to constructed, the APIP interface 524 can be provided with sufficient drive capability to allow it to be connected to an external interconnect, for example, a large crossbar switch. In this fashion, many of the adaptive processor(s) 510 and microprocessor(s) 204 can work in a randomly interconnected way to solve problems. Due to the potential for any given port of the switch to be busy at any point in time, it may be desirable for the outbound path of the APIP interface 524 to be equipped with a small buffer (e.g. read request buffer 522) to allow the completion of "read" memory accesses that may be underway when the path goes "busy" without the loss of data. As soon as the path is free, the buffer 522 can be drained and transmitted and the current DMA operation resumed. One way to indicate a busy path could be communicated through the use of a "busy" signal sent from the busy receiver port to the transmitter to which it is connected. Consequently, the APIP interface 524 will stop transmission when it receives a "busy" signal and will generate a separate "busy" signal when it can no longer receive data for whatever reason.

To aid in control of the adaptive processor 510 as well as in direct communication between the adaptive processor(s) 510 and the microprocessor(s) 204, a series of, for example, 64 bit control registers 526 may be included as a portion of the memory and I/O controller 502. These registers 526 would be ideally accessible from either the microprocessor(s) 204 or the adaptive processor(s) 510. Typically there is a need for processors 204 to interrupt each other in a relatively large computing system 500. The same is true when dealing with a hybrid computing system. Therefore, the APIP interface 524 can be provided with the ability to accept inter-processor 204 interrupts from the microprocessor 204 and send them to other processors 204 in the system as well as performing the reverse function and receive inter-processor 204 interrupts.

In a particular implementation, the APIP interface 524 may be similar in physical appearance to an AGP graphics port. In fact, since the accelerated graphics port ("AGP") is typically not used on servers due to the absence of monitors, it is possible to use the same pins otherwise available on a typical North Bridge device and use a register in order to enable the port to be configured as either AGP or APIP.

Figure 7:
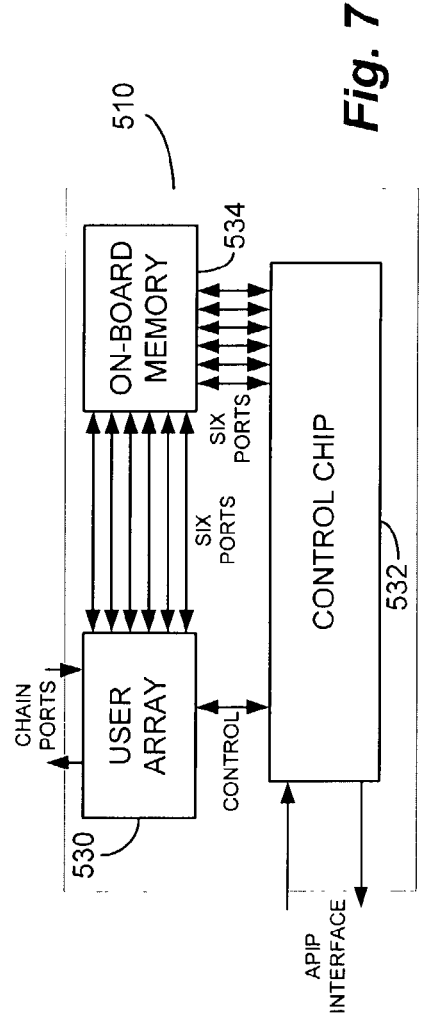
FIG. 7 is a functional block diagram of a multi-adaptive processor (MAP™, a trademark of SRC Computers, Inc.) for possible use as an adaptive processor in a hybrid computing system in accordance with the present invention.

With reference additionally now to FIG. 7, a functional block diagram of a multi-adaptive processor element (MAP™, a trademark of SRC Computers, Inc.) for possible use as an adaptive processor element 510 is shown. The adaptive processor element 510 includes a user array 539 which may comprise one or more field programmable gate arrays ("FPGAs") as disclosed in the foregoing issued patents and pending patent application. A chain port may be provided for directly coupling two or more adaptive processor elements 510 as shown.

A control chip 532 couples the adaptive processor element 510 to the APIP interface 524 of the associated memory and I/O controller 502 and provides control functionality to the corresponding user array 530. On-board memory 534 is coupled to the control chip 532 and user array 530, for example, though six ports. Briefly, the write data and read data lines of the memory and I/O controller 502 are coupled to the control chip (or block) 532 which provides addresses to the on-board memory 534 and receives addresses from the user array 530 on a number of address lines. Data supplied on the write data line is provided by the control chip 532 to the on-board memory 534 on a number of data lines and data read out of the on-board memory 534 is provided on these same lines both to the user array 530 as well as the control chip 532 for subsequent presentation to the APIP interface 524. As indicated, a chain port may be coupled to the user array 530 for communication of read and write data directly with one or more other adaptive processors 510.

Figure 8:
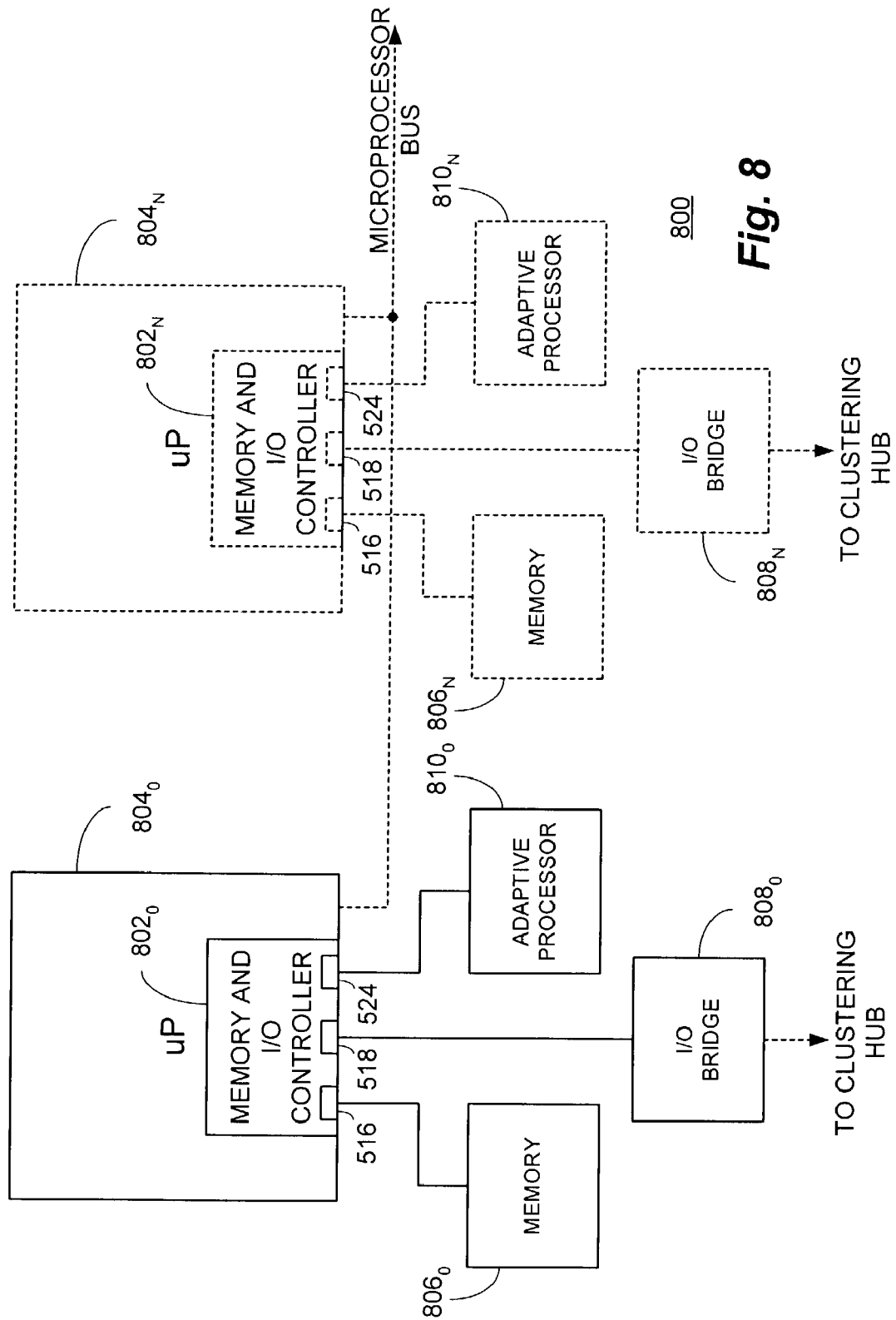
FIG. 8 is a functional block diagram of a portion of an adaptive processor interface port connected hybrid computing system in accordance with another embodiment of the present invention wherein the functions of the memory and I/O controller have been incorporated into the microprocessor itself.

With reference additionally now to FIG. 8, a functional block diagram of a portion of an adaptive processor interface port connected hybrid computing system 800 in accordance with another embodiment of the present invention is shown. In the computing system 800, the functions of the memory and I/O controller 802 have been incorporated into the microprocessor 804 as shown. In this manner, a memory interface 516 of the memory and I/O controller 802 may be coupled to a memory block 806, an inter-bridge interface 518 may be coupled to an I/O bridge 808 and an APIP interface 524 may be coupled to an adaptive processor 810. In the computing system 800, the functionality of the memory and I/O controller 502 (FIG. 6) is maintained but, by integrating its functionality into the microprocessor 804 by the inclusion of an integral memory and I/O controller 802, the need for a separate chip or integrated circuit device is eliminated.

While there have been described above the principles of the present invention in conjunction with specific computing system architectures and components, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer system comprising:
    at least one microprocessor presenting a front-side bus;
    a memory controller coupled to said front-side bus wherein said memory controller comprises a second bus coupled to a computer system clustering hub, said memory controller further coupled to a memory bus and an adaptive processor port;
    a memory block coupled to said memory bus; and
    an adaptive processor coupled to said adaptive processor port, wherein said at least one microprocessor and said adaptive processor exhibit equal memory bandwidth and latency.

2. The computer system of claim 1 wherein said computer system further comprises a plurality of microprocessors coupled to said front-side bus.

3. The computer system of claim 2 further comprising:
    at least one additional memory controller coupled to said clustering hub through another second bus and further coupled to at least one other microprocessor through another front-side bus.

4. The computer system of claim 3 further comprising:
    another memory block coupled to said at least one additional memory controller through another memory bus.

5. The computer system of claim 3 further comprising:
    at least one additional adaptive processor coupled to another adaptive processor port of said at least one additional memory controller.

6. The computer system of claim 1 wherein said adaptive processor port is alternatively configurable as a graphics port.

7. The computer system of claim 1 wherein said adaptive processor comprises:
    a control element coupled to said adaptive processor port;
    a user array coupled to said control element; and
    a memory element coupled to said control element and said user array.

8. The computer system of claim 7 wherein said user array further comprises:
    a chain port for coupling said adaptive processor to a second adaptive processor.

9. The computer system of claim 7 wherein said user array comprises a field programmable gate array.

10. The computer system of claim 1 wherein said memory controller comprises:
    a memory bus arbitrator;
    a first bus interface associated with said memory bus arbitrator for controlling memory access requests received on said front-side bus;
    a memory bus interface associated with said memory bus arbitrator for controlling access to said memory block; and
    an adaptive processor port interface associated with said memory bus arbitrator for controlling memory access requests received on said adaptive processor port.

11. The computer system of claim 10 further comprising:
    a direct memory access engine coupling said memory bus arbitrator and said adaptive processor port interface.

12. The computer system of claim 11 wherein said direct memory access engine is coupled to said adaptive processor port interface by means of respective read and write data lines.

13. The computer system of claim 11 further comprising;
    a read request buffer associated with said direct memory access engine.

14. The computer system of claim 11 further comprising a busy signal line coupling said adaptive processor port interface and said direct memory access engine.

15. The computer system of claim 10 further comprising:
    at least one control register in communication between said front-side bus interface and said adaptive processor port interface.

16. The computer system of claim 10 further comprising:
    a second bus interface associated with said memory bus arbitrator.

17. The computer system of claim 1 wherein said memory controller comprises an integrated circuit device.

18. The computer system of claim 1 wherein said at least one microprocessor comprises said memory controller.

19. A hybrid computer system comprising:
    at least one microprocessor;
    a memory block:
    a memory controller coupled to said microprocessor and said memory block for controlling accesses to said memory block by said at least one microprocessor, said memory controller further coupled to an adaptive processor port and a computer system clustering hub; and
    at least one adaptive processor coupled to said adaptive processor port, said memory controller further controlling access to said memory block by said at least one adaptive processor, wherein said at least one microprocessor and said adaptive processor exhibit equal memory bandwidth and latency.

20. The hybrid computing system of claim 19 wherein said memory controller comprises:
    a memory bus arbitrator;
    a first bus interface associated with said memory bus arbitrator for controlling memory access requests received from said at least one microprocessor;
    a memory bus interface associated with said memory bus arbitrator for controlling access to said memory block; and
    an adaptive processor port interface associated with said memory bus arbitrator for controlling memory access requests received from said at least one adaptive processor.

21. The hybrid computing system of claim 20 further comprising:
    a direct memory access engine coupling said memory bus arbitrator and said adaptive processor port interface.

22. The hybrid computing system of claim 21 wherein said direct memory access engine is coupled to said adaptive processor port interface by means of respective read and write data lines.

23. The hybrid computing system of claim 21 further comprising:
a read request buffer associated with said direct memory access engine.

24. The hybrid computing system of claim 21 further comprising a busy signal line coupling said adaptive processor port interface and said direct memory access engine.

25. The hybrid computing system of claim 20 further comprising:
at least one control register in communication between said first bus interface and said adaptive processor port interface.

26. The hybrid computing system of claim 20 further comprising:
a second bus interface associated with said memory bus arbitrator.

27. The hybrid computing system of claim 19 wherein said memory controller comprises an integrated circuit device.

28. The hybrid computing system of claim 19 wherein said at least one microprocessor comprises said memory controller.

29. A computer system comprising:
first and second processing elements wherein said second processing element comprises an adaptive processor;
a memory block; and
a memory controller coupled to said first processing element through a first bus and said second processing element through a second bus, said memory controller further coupled to a computer system clustering hub, said memory controller for controlling accesses to said memory block by said first and second processing elements,
wherein said first and second processing elements exhibit equal memory bandwidth and latency.

30. The computing system of claim 29 comprising:
a memory bus arbitrator;
a first bus interface associated with said memory bus arbitrator for controlling memory access requests received from said first processing element;
a memory bus interface associated with said memory bus arbitrator for controlling access to said memory block; and
a second bus interface associated with said memory bus arbitrator for controlling memory access requests received from said second processing element.

31. The computing system of claim 30 further comprising:
a direct memory access engine coupling said memory bus arbitrator and said second bus interface.

32. The computing system of claim 31 wherein said direct memory access engine is coupled to said second bus interface by means of respective read and write data lines.

33. The computing system of claim 31 further comprising;
a read request buffer associated with said direct memory access engine.

34. The computing system of claim 31 further comprising a busy signal line coupling said second bus interface and said direct memory access engine.

35. The computing system of claim 29 further comprising:
at least one control register in communication between said first bus interface and said second bus interface.

36. The computing system of claim 30 further comprising:
a third bus interface associated with said memory bus arbitrator.

37. The computing system of claim 29 wherein said memory controller comprises an integrated circuit device.

38. The computing system of claim 29 wherein said memory controller is integrated into said first processing element.

* * * * *